(12) United States Patent
Yamazaki (10) Patent No.: US 8,408,261 B2
(45) Date of Patent: Apr. 2, 2013

(54) PNEUMATIC TIRE

(75) Inventor: Shinichiro Yamazaki, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 634 days.

(21) Appl. No.: 12/595,087

(22) PCT Filed: Apr. 9, 2008

(86) PCT No.: PCT/JP2008/057036
§ 371 (c)(1),
(2), (4) Date: Oct. 8, 2009

(87) PCT Pub. No.: WO2008/126875
PCT Pub. Date: Oct. 23, 2008

(65) Prior Publication Data
US 2010/0163152 A1    Jul. 1, 2010

(30) Foreign Application Priority Data

Apr. 9, 2007   (JP) ................................. 2007-101623

(51) Int. Cl.
*B60C 15/04* (2006.01)
(52) U.S. Cl. ........................... 152/540; 245/1.5; 152/547
(58) Field of Classification Search ................. 152/540; 245/1.5; *B60C 15/00, 15/04, 15/05*
See application file for complete search history.

(56) References Cited

U.S. PATENT DOCUMENTS
2,292,980 A * 8/1942 White ........................... 152/540
(Continued)

FOREIGN PATENT DOCUMENTS
GB          1584467      *   2/1981
JP       49-119301  A       11/1974
(Continued)

OTHER PUBLICATIONS

Extended European Search Report issued in the corresponding European Application No. 08740139.4 dated Oct. 5, 2011.
(Continued)

*Primary Examiner* — Justin Fischer
*Assistant Examiner* — Philip N Schwartz
(74) *Attorney, Agent, or Firm* — Sughrue Mion, PLLC (57) ABSTRACT

The present invention provides a pneumatic tire in which a sectional shape of a bead wire and arrangement of the bead wires have been optimized to increase rotational rigidity of the bead core as a whole and suppress pulling-off of a carcass, so that durability of the bead portion can be enhanced. The pneumatic tire comprises: a pair of bead portions 1; a pair of side wall portions; a tread portion extending over the respective sidewall portions; and a carcass 4 extending in a toroidal shape across the aforementioned portions and having respective end portions being turned up around the bead cores 2, wherein each bead wire 3 has, in a section in the tire widthwise direction, a parallelogram section including a first acute corner portion 7a positioned on the outer side in the tire widthwise direction and on the inner side in the tire radial direction of a second acute corner portion 7b, a first obtuse corner portion 9a positioned on the inner side in the tire widthwise direction and on the outer side in the tire radial direction of the first acute corner portion 7a, a second obtuse corner portion 9b positioned on the inner side in the tire widthwise direction of the first acute corner portion 7a and on the inner side or aligned, in the tire radial direction, of/with the first acute corner portion 7a.

12 Claims, 9 Drawing Sheets

U.S. PATENT DOCUMENTS

| | | | |
|---|---|---|---|
| 3,949,800 A * | 4/1976 | Lejeune | 152/540 |
| 4,166,492 A * | 9/1979 | Pfeiffer | 152/540 |
| 4,747,440 A | 5/1988 | Holmes et al. | |
| 5,007,471 A | 4/1991 | Maiocchi | |
| 2001/0050129 A1 * | 12/2001 | Ohara et al. | 152/547 |
| 2006/0157181 A1 * | 7/2006 | Mori | 152/540 |

FOREIGN PATENT DOCUMENTS

| | | | |
|---|---|---|---|
| JP | 63-312207 A | 12/1988 | |
| JP | 11-58551 A | 3/1999 | |
| JP | 2001-191754 | 7/2001 | |
| JP | 2003-326922 A | 11/2003 | |
| WO | WO 9012696 A1 * | 11/1990 | |

OTHER PUBLICATIONS

International Search Report dated Jul. 3, 2008 (4 pages).

* cited by examiner

PNEUMATIC TIRE

TECHNICAL FIELD

The present invention relates to a tire including: a pair of bead portions having bead cores embedded therein, each bead core being constituted of annular bead wires juxtaposed in the tire widthwise direction; a pair of side wall portions extending from the bead portions on the outer side in the tire radial direction; a tread portion extending over the respective sidewall portions; and a carcass extending in a toroidal shape across the aforementioned portions and having respective end portions thereof being turned up around the bead cores.

PRIOR ART

In general, a bead core of a pneumatic tire has an important function of holding a carcass, as well as enhancing fitted engagement of a tire with a rim to ensure sealing property of the tire. In order to make these functions be appropriately performed, it is normally necessary to suppress shape distortion of the bead core during a vulcanization process and improve the assembling property of a tire with a rim.

In view of this, there has conventionally been made a proposal, as disclosed in JP 49-119301 Laid-Open, to form a bead core by winding a bead wire having a quadrilateral section with opposite two sides in parallel with each other in the tire widthwise direction such that the bead wires are in contact with each other in the tire widthwise direction and radial direction, thereby increasing a contact area of adjacent bead wires to enhance stability in shape of the bead cores.

Further, there has been made a proposal, as disclosed in JP 63-312207 Laid-Open, to improve stability in shape of a bead core and the assembling property by using a bead wire having a shape in which opposite sides in the tire radial direction are in parallel with each other and the distance between the opposite sides on the side portions varies in a section in the tire widthwise direction.

DISCLOSURE OF THE INVENTION

Problems to be Solved by the Invention

However, the tires as disclosed in the aforementioned references, although they are capable of suppressing shape distortion of bead cores during a vulcanization process and improving the assembling property of a tire with a rim, do not pay so much attention to durability of the tire, in particular, to durability of a bead portion and therefore are not satisfactory in terms of durability of the bead portions in view of the recent increasing demand for heavier load. Specifically, when a tire is inflated, a load is applied thereon and the shape of the tire is changed over time, a bead core is rotated in a direction in which a carcass is pulled out in the tire widthwise direction. This rotation decreases the holding force applied by the bead core on the carcass and causes pulling-out of the carcass, possibly resulting in a problem of deteriorated durability of the bead portion.

In view of the problem above, an object of the present invention is to provide a pneumatic tire in which a sectional shape of each bead wire and arrangement of the bead wires have been optimized to increase rotational rigidity of the bead core as a whole and suppress pulling-off of a carcass, so that durability of the bead portion can be enhanced.

Means for Solving the Problem

The present invention has been contrived to solve the problem described above. The present invention is characterized in that a pneumatic tire comprises: a pair of bead portions having bead cores embedded therein, each bead core being constituted of annular bead wires juxtaposed in the tire widthwise direction; a pair of side wall portions extending from the bead portions on the outer side in the tire radial direction; a tread portion extending over the respective sidewall portions; and a carcass extending in a toroidal shape across the aforementioned portions and having respective end portions being turned up around the bead cores, wherein the bead wire has, in a section in the tire widthwise direction, a parallelogram section having a pair of acute corner portions including a first acute corner portion and a second acute corner portion and a pair of obtuse corner portions including a first obtuse corner portion and a second obtuse corner portion, the first acute corner portion is positioned on the outer side in the tire widthwise direction and on the inner side in the tire radial direction of the second acute corner portion, the first obtuse corner portion is positioned on the inner side in the tire widthwise direction and on the outer side in the tire radial direction of the first acute corner portion, and the second obtuse corner portion is positioned on the inner side in the tire widthwise direction of the first acute corner portion and on the inner side or aligned, in the tire radial direction, of/with the first acute corner portion.

In the pneumatic tire described above, a section in the tire widthwise direction of the bead wire is a parallelogram and the adjacent faces of the bead wires adjacent to each other in the tire widthwise direction face each other such that these adjacent faces are inclined in a direction in which stress acting on a predetermined direction or stress acting on the direction of pulling a carcass out is easily transferred, whereby rotational stress applied on the bead core when the tire is inflated, a load is applied thereon and the shape of the tire is changed over time is dispersed such that rotational distortion of the bead core as a whole is reduced, in other words, rotational rigidity is enhanced. Further, since the adjacent faces are inclined in a direction in which the adjacent bead wires are rather discouraged from moving up/down in the tire radial direction when the stress in the predetermined direction described above is applied thereon, the distribution of tension in the circumferential direction in a section in the tire widthwise direction of the bead wire, of the bead core as a whole, is made even.

Yet further, the adjacent bead wires are preferably in contact with each other.

Yet further, an angle formed by a side between the first acute corner portion and the second obtuse corner portion of a parallelogram section of each bead wire, with respect to the tire widthwise direction, is preferably in the range of 0 to 25°.

Yet further, the acute corner portions of each bead wire are preferably chamfered. In the present invention, "an acute corner portion is chamfered" represents the acute corner portion being rounded, as well as the acute corner portion being provided with linear slants.

Yet further, in each bead core, the bead wires are preferably fixed as a bundle by a metal band or a textile spirally wound thereon in the direction in which the bead core extends.

Yet further, each bead core is preferably formed by winding plural bead wires plural times to stack the bead wires up in the tire radial direction as a bead wire unit and juxtaposing plural bead wire units in the tire widthwise direction. The winding starting end and the winding finishing end of each bead wire are preferably positioned not to be aligned with each other in the tire circumferential direction of the bead core.

Yet further, each bead core is preferably formed by winding plural bead wires plural times to stack the bead wires up in the tire radial direction as a bead wire unit and juxtaposing plural bead wire units in the tire widthwise direction. It is preferable that end portions constituting the winding starting ends of the respective bead wires are offset from each other in the tire circumferential direction of the bead core and end portions constituting the winding finishing ends of the respective bead wires are offset from each other in the tire circumferential direction of the bead core.

Yet further, an angle formed by a line linking the position in the tire circumferential direction of the winding starting end of each bead core and the center of the bead core, with respect to a line linking the position in the tire circumferential direction of the winding finishing end of the bead core and the center of the bead core, is preferably in the range of 30 to 90°.

Yet further, a sectional shape in the tire widthwise direction of each bead core is preferably a parallelogram or a rectangle.

Yet further, a rubber member having rubber hardness of 85 Hs or higher is preferably provided to extend from between the bead core and the carcass toward the upper side in the tire radial direction of the bead core. In the present invention, "rubber hardness" represents rubber hardness measured by using a durometer hardness tester (type A) at a test temperature of 23° C. according to JIS K6253.

Yet further, a reinforcing layer is preferably provided between the carcass and the bead core such that the reinforcing layer wraps the bead core.

As described above, according to the pneumatic tire of the present invention, rotational rigidity of the bead core as a whole can be enhanced and pulling-off of the carcass can be suppressed. Further, the distribution of tension in the circumferential direction in a section in the tire widthwise direction of the bead wire can be made even, whereby durability of the bead wire is improved. As a result, durability of the bead portion can be enhanced.

BRIEF DESCRIPTION OF THE DRAWINGS

FIGS. 3(a) and 3(b) are sectional views in the tire widthwise direction, each showing a section of a main portion of the bead core. Specifically.

FIGS. 6(a) and 6(b) are views each showing the bead core of the pneumatic tire of yet another embodiment according to the present invention.

| Explanation of Reference Numbers | |
|---|---|
| 1 | Bead portion |
| 2 | Bead core |
| 3 | Bead wire |
| 4 | Carcass |
| 5 | Rim |
| 7 | Acute corner portion |
| 7a | First acute corner portion |
| 7b | Second acute corner portion |
| 9 | Obtuse corner portion |
| 9a | First obtuse corner portion |
| 9b | Second obtuse corner portion |
| 10 | Side |
| 11 | Metal band |
| 13 | Textile |
| 15 | Winding starting end |
| 17 | Winding finishing end |
| 19 | High hardness rubber |
| 20 | Reinforcing layer |

BEST MODE FOR CARRYING OUT THE INVENTION

Figure 1:
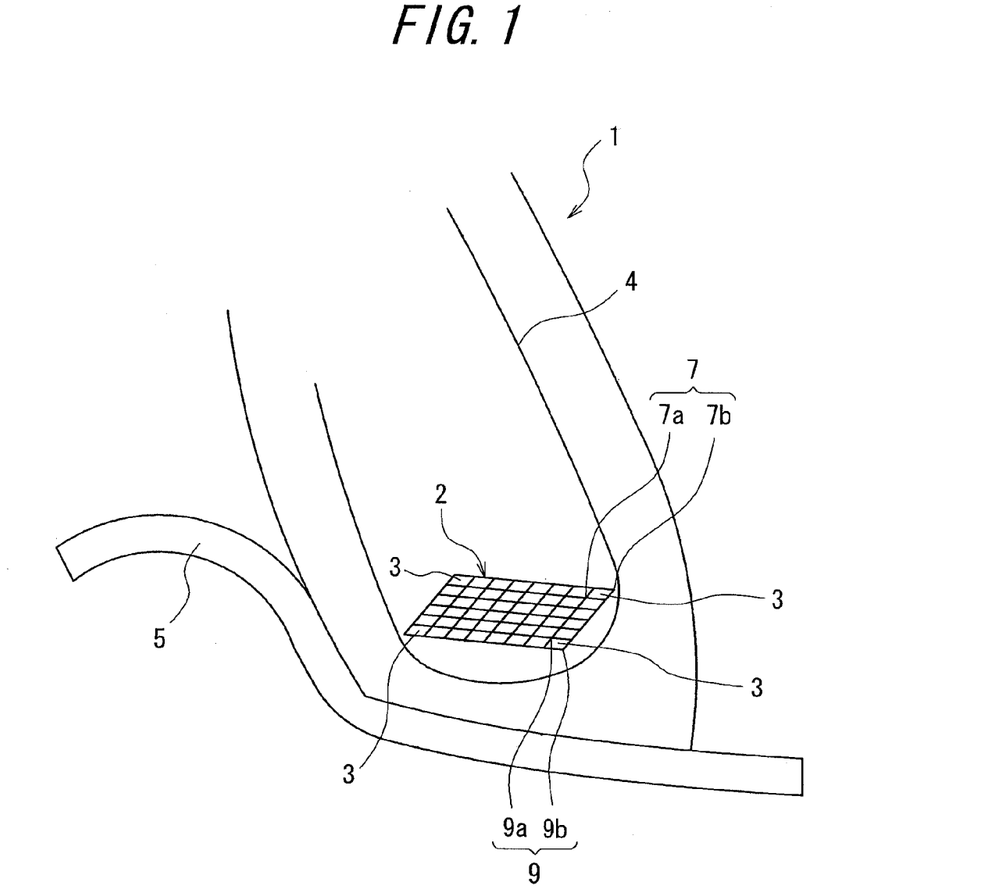
FIG. 1 is a sectional view in the tire widthwise direction of a bead portion of a pneumatic tire assembled with a rim, of an embodiment according to the present invention.

An embodiment of the present invention will be described hereinbelow with reference to drawings. FIG. 1 is a sectional view showing a section in the tire widthwise direction of a bead portion of a pneumatic tire (which will be referred to simply as a "tire" hereinafter) assembled with a rim, of an embodiment according to the present invention. FIGS. 2(a) to 2(c) are sectional views in the tire widthwise direction, respectively showing various types of bead cores applicable to the tire of the present invention.

Each bead portion 1 of the tire as shown in FIG. 1 includes a bead core 2, bead wires 3 constituting the bead core 2, and a carcass 4 extending in a toroidal shape between a pair of the bead cores 1. The tire of the present embodiment also has other components such as a belt (not shown) according to the conventional practice. The carcass 4 is either a radial carcass or a bias carcass.

As shown in FIG. 1, the bead core 2 is constituted of annular bead wires 3 juxtaposed, for example, in eight rows in the tire widthwise direction. These annular bead wires 3 in eight rows may be stacked up to plural stages (e.g. six stages). The sectional shape in the tire widthwise direction of each bead wire 3 is a parallelogram having a pair of acute corner portions 7 including a first acute corner portion 7a and a second acute corner portion 7b and a pair of obtuse corner portions 9 including a first obtuse corner portion 9a and a second obtuse corner portion 9b. The first acute corner portion 7a is positioned on the outer side in the tire widthwise direction (on the left hand side in FIG. 1) and on the inner side in the tire radial direction (on the lower side in FIG. 1) of the second acute corner portion, the first obtuse corner portion 9a is positioned on the inner side in the tire widthwise direction (on the right hand side in FIG. 1) and on the outer side in the tire radial direction (on the upper side in FIG. 1) of the first acute corner portion 7a, and the second obtuse corner portion 9b is positioned on the inner side in the tire widthwise direction of the first acute corner portion 7a and on the inner side or aligned, in the tire radial direction, of/with the first acute corner portion 7a.

Further, the bead wire 3 may be arranged such that the first acute corner portion 7a and the first obtuse corner portion 9a vertically next to each other in the tire radial direction are in direct contact with each other, as shown in FIG. 1 and FIG. 2(c). Alternatively, the bead wire 3 may be arranged such that said first acute corner portion 7a and said first obtuse corner portion 9a are offset from each other in the tire widthwise direction, as shown in FIGS. 2(a) and 2(b).

The carcass 4 is formed, for example, by disposing a ply in which organic fiber cords are radially disposed or disposed in a biased manner with respect to the tire rotating direction, in a toroidal shape across a pair of the bead cores 2. Ends of the carcass 4 are turned up around the bead cores 2 from the inner side toward the outer side of the tire, respectively, so that these ends are fixed on the bead cores 2.

Next, the stress transfer properties when stress (rotational stress) is exerted in the direction of pulling the carcass 4 out (i.e. the direction of arrow A) will be described in details with reference to FIGS. 3(a) and 3(b) with regard to a case where the second acute corner portion 7b of each bead wire is disposed on the outer side in the tire radial direction and on the inner side in the tire widthwise direction, according to the present invention, and a case where the second acute corner portion 7b is disposed on the inner side in the tire radial direction and on the inner side in the tire widthwise direction, running counter to the teaching of the present invention. In the explanation below, the right hand side, on the sheet of paper, of FIGS. 3(a) and 3(b) represents the inner side in the tire widthwise direction, and the upper side, on the sheet of paper, of FIGS. 3(a) and 3(b) represents the outer side in the tire radial direction.

In a pneumatic tire in general, tension toward the outer side in the tire radial direction is exerted on the carcass 4 when the tire is inflated, a load is applied thereon and the shape of the tire is changed over time, so that rotational stress in the direction of arrow A is exerted on the bead core 2. In this situation, in the bead wire arrangement as shown in FIG. 3(a), the bead wire 3a on the right hand side, of the bead wires 3a, 3b laterally adjacent to each other in the tire widthwise direction, tends to move in the direction of arrow α, while the bead wire 3b on the left hand side tends to move to the opposite direction, i.e. the direction of arrow β. In this case, the adjacent faces S1 of the adjacent bead wires are inclined in the direction which facilitates transfer of stress by each of the bead wires 3a, 3b. Specifically, the bead wire 3a on the right hand side pushes the bead wire 3b on the left hand side in the direction of arrow α and the bead wire 3b on the left hand side pushes the bead wire 3a on the right hand side in the direction of arrow β, whereby stress is effectively transferred.

On the other hand, in the arrangement of the bead wire as shown in FIG. 3(b), when rotational stress is exerted in the direction of arrow A, the bead wire 3a on the right hand side, of the bead wires 3a, 3b laterally adjacent to each other in the tire widthwise direction, tends to move in the direction of arrow α, while the bead wire 3b on the left hand side tends to move to the opposite direction, i.e. the direction of arrow β in a manner similar to that described above. However, in this case, the adjacent faces S1' of the adjacent bead wires are not inclined in the direction which would facilitate transfer of stress by each of the bead wires 3a, 3b, whereby the bead wire 3a on the right hand side and the bead wire 3b on the left hand side move in the direction in which these wires are separated from each other and therefore stress is not effectively transferred.

Figure 3:
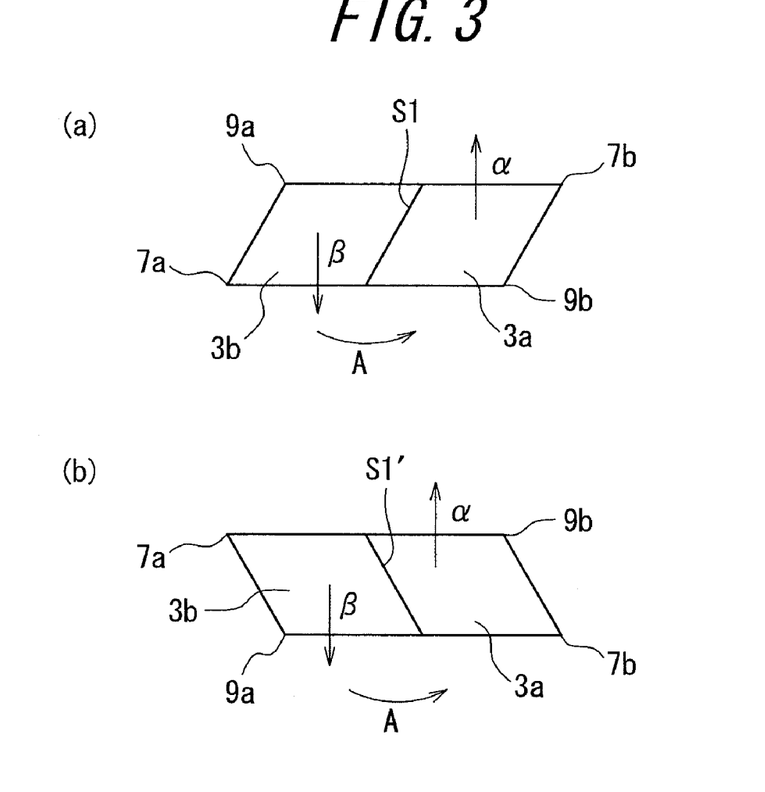
FIG. 3(a) is a sectional view of a bead core according to the present invention and FIG. 3(b) is a sectional view of a bead core as a comparative example running counter to the present invention.

That is, in the pneumatic tire according to the present invention, the sectional shape in the tire widthwise direction of the bead wire 3 is a parallelogram and the adjacent faces S1 of the bead wires 3 adjacent to each other in the tire widthwise direction face each other such that these adjacent faces are inclined in a direction in which stress acting on the direction of pulling a carcass 4 out (i.e. the direction of arrow A in FIG. 3) is easily transferred, whereby rotational stress applied on the bead core 2 when the tire is inflated, a load is applied thereon and the shape of the tire is changed over time is dispersed such that rotational distortion of the bead core 2 as a whole is reduced, in other words, rotational rigidity thereof is enhanced. Further, since the adjacent faces S1 are inclined in a direction in which the adjacent bead wires 3 are rather discouraged from moving up/down in the tire radial direction when rotational stress is exerted in the direction of arrow A, the distribution of tension in the circumferential direction in a section in the tire widthwise direction of the bead wire 3, of a bead core 2 as a whole, is made even.

As described above, according to the pneumatic tire of the present invention, rotational rigidity of the bead core 2 as a whole is increased so that pulling-out of the carcass 4 can be suppressed. Further, as a result of increase in rotational rigidity of the bead core 2, rotation of the bead core 2 is suppressed and the distribution of tension in the circumferential direction in a section in the tire widthwise direction of the bead wire 3 is prevented from becoming uneven, whereby durability of the bead wire 3 and thus durability of the bead portion 1, as well, are significantly enhanced.

The angle of the acute corner portion 7 is preferably in the range of 60 to 85 degrees and more preferably in the range of 65 to 75 degrees. In a case where said angle is smaller than 60 degrees, deterioration in rigidity in the tire radial direction of the bead wire may be conspicuous (in a case where the angle of the acute corner portion 7 is smaller than 60 degrees, rigidity of the bead wire is approximately 75% of that in the case where the sectional shape in the tire widthwise direction of the bead wire is rectangular). In a case where the angle of the acute corner portion 7 exceeds 85 degrees, improvement of stress transfer between the bead wires adjacent to each other in the tire widthwise direction, which improvement the present invention aims at, may not be achieved in a satisfactory manner. By comprehensively considering rigidity in the tire radial direction of the bead wire and the stress transfer between the adjacent bead wires as described above, the angle of the acute corner portion can be optimized.

Further, the adjacent bead wires 3 are preferably in direct contact with each other, although a cushion member such as rubber may be interposed between the adjacent bead wires 3. In a case a cushion member such as rubber is interposed between the adjacent bead wires 3, the cushion member is crushed due to creep deformation over time and the shape of the bead core as a whole may be changed. Therefore, by bringing the adjacent bead wires 3 into direct contact with each other, change over time of the bead core 2 as a whole can be reduced, pulling-off of the carcass can be further suppressed and strain at the carcass end portion can be decreased, as compared with the case where a cushion member is interposed between the adjacent bead wires 3.

In the embodiments as shown in FIGS. 2(a) to 2(c), in a section in the tire widthwise direction, the angle formed by a side 10 linking the first acute corner portion 7a and the second obtuse corner portion 9b of each bead wire 3, with respect to the tire widthwise direction, is in the range of 0 to 25 degrees (0 and 25 degrees are inclusive). Accordingly, a predetermined taper angle can be imparted to the bead core 2 when the bead core 2 is formed by winding of the bead wires 3 and thus a proper taper angle can be imparted to the lower part of the bead portion 1 in contact with the rim.

Figure 4:
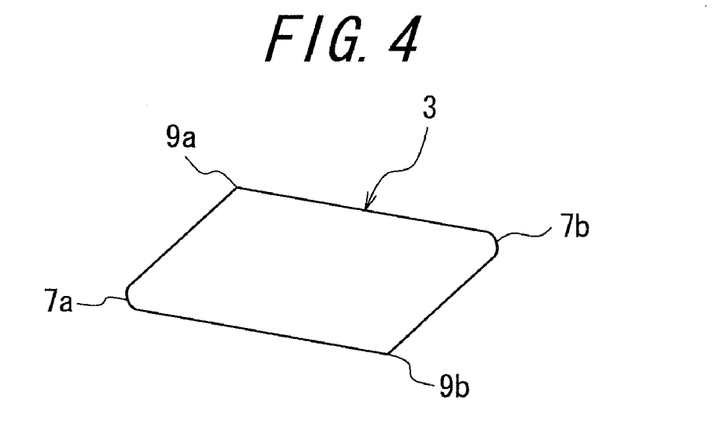
FIG. 4 is a sectional view in the tire widthwise direction of the bead wire in the pneumatic tire of another embodiment according to the present invention.

In an embodiment as shown in FIG. 4, the acute corner portions 7a, 7b of each bead wire 3 are chamfered respectively. Accordingly, stress exerted on the acute corner portions 7a, 7b can be dispersed when rotational stress in the direction of arrow A (refer to FIG. 3(*a*)) is applied on the bead core 2. Further, concentration of stress on the acute corner portions 7a, 7b can be avoided, whereby durability of the carcass 4 and thus the durability of the bead portion 1, as well, can be enhanced.

Figure 5:
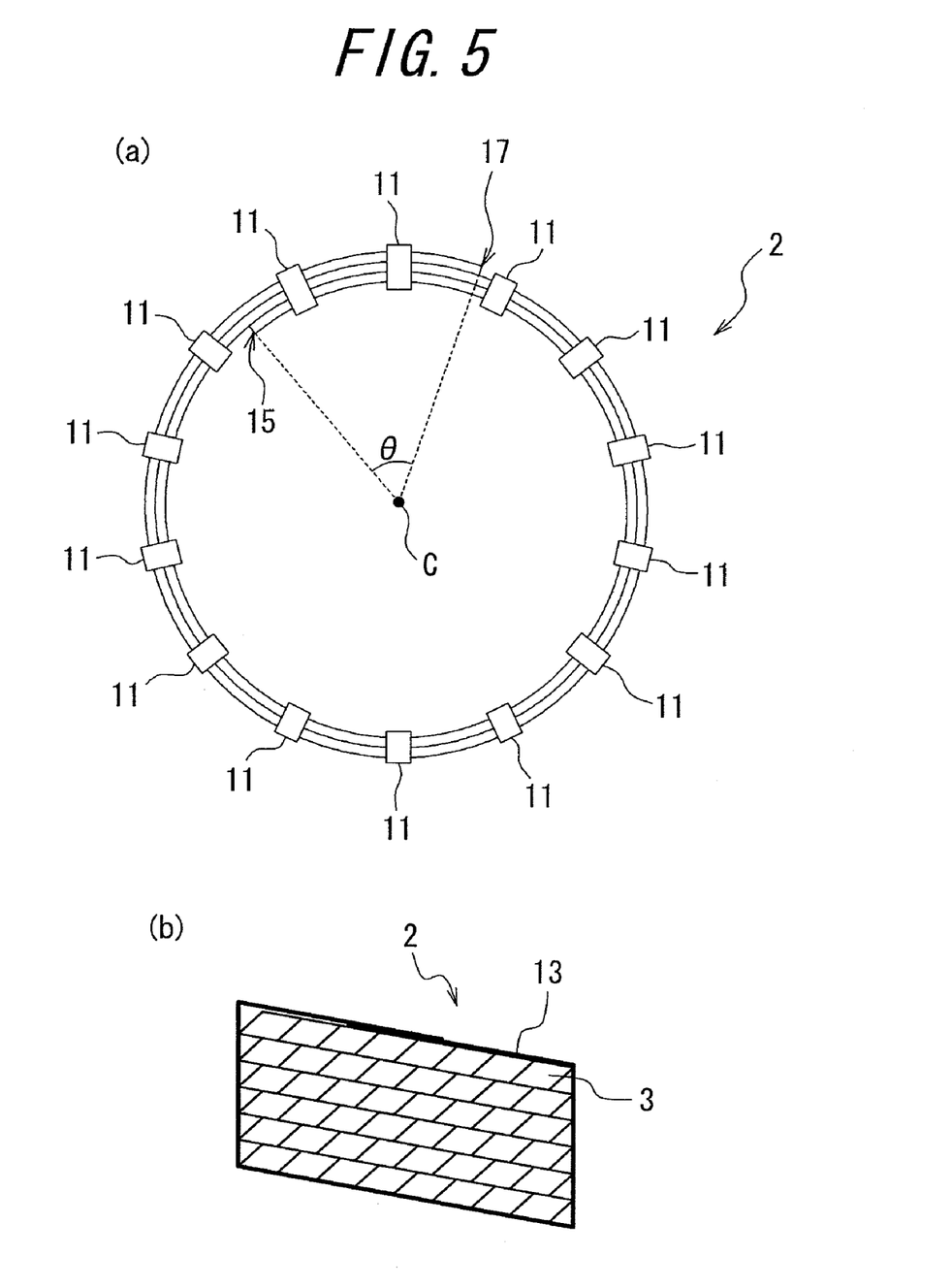
FIG. 5(a) is side view and FIG. 5(b) is a sectional view in the tire widthwise direction, of the bead core in the pneumatic tire of yet another embodiment according to the present invention.

In an embodiment as shown in FIGS. 5(*a*) and 5(*b*), the bead core 2 is formed by fixing the bead wires 3 as a bundle by a metal band 11. As the metal band 11, those made of steel or aluminum alloy can be preferably employed. The bead core 2 may be fixedly bundled by a textile 13 spirally wound thereon in the direction in which the bead core extends. Suitable examples of the textile 13 include a fabric using yarns of organic fibers such as nylon, rayon and polyester. Due to this, change in shape of the bead core 2 during vulcanization and/or running of the tire can be suppressed and the tire performance can be improved.

Further, in the example shown in FIG. 5(*a*), the bead core 2 has a structure in which plural bead wires 3, wound around plural times to be stacked up in the tire radial direction as a laminated unit, are juxtaposed as units in plural rows in the tire widthwise direction; and the winding starting end 15 and the winding finishing end 17 of each bead wire 3 are not aligned with each other in the tire circumferential direction. The bead core 2 constituted of plural bead wires 3 as described above has an advantage in that time required for production of the bead core 2 can be significantly reduced, as compared with the bead core 2 structured by sequentially winding a single bead wire 3 in the tire radial direction. However, in a case where the bead core 2 is formed by winding plural bead wires 3 plural times to be stacked up in the tire radial direction as a laminated unit and juxtaposing the laminated units in plural rows in the tire widthwise direction, if the winding starting end 15 and the winding finishing end 17 of the bead wire 3 cluster at one site on the circumference of the bead core 2, there arises stepwise difference in rigidity at the site, stress tends to concentrate on the site and thus fracture strength may deteriorate. The winding starting end 15, in particular, tends to function as a fulcrum of the bending stress. In view of this, by offsetting the positions in the circumferential direction of the winding starting end 15 and the winding finishing end 17 of the same one bead wire 3 from each other, as shown in the present embodiment, the problem of stress concentration can be eluded, while the production efficiency of the bead core 2 is improved. Further, an angle θ formed by a line linking the position in the tire circumferential direction of the winding starting end 15 of each bead core 2 and the center C of the bead core, with respect to a line linking the position in the tire circumferential direction of the winding finishing end 17 of the same bead core and the center of the bead core C, is preferably in the range of 30 to 90° and more preferably in the range of 40 to 80°. It is particularly preferable that the angle θ is 60°. In a case where the angle θ is smaller than 30°, concentration of stress may not be sufficiently reduced. In a case where the angle θ exceeds 90°, the weight balance on the circumference of the bead core 2 deteriorates, whereby the uniformity of the tire may deteriorate.

Figure 6:
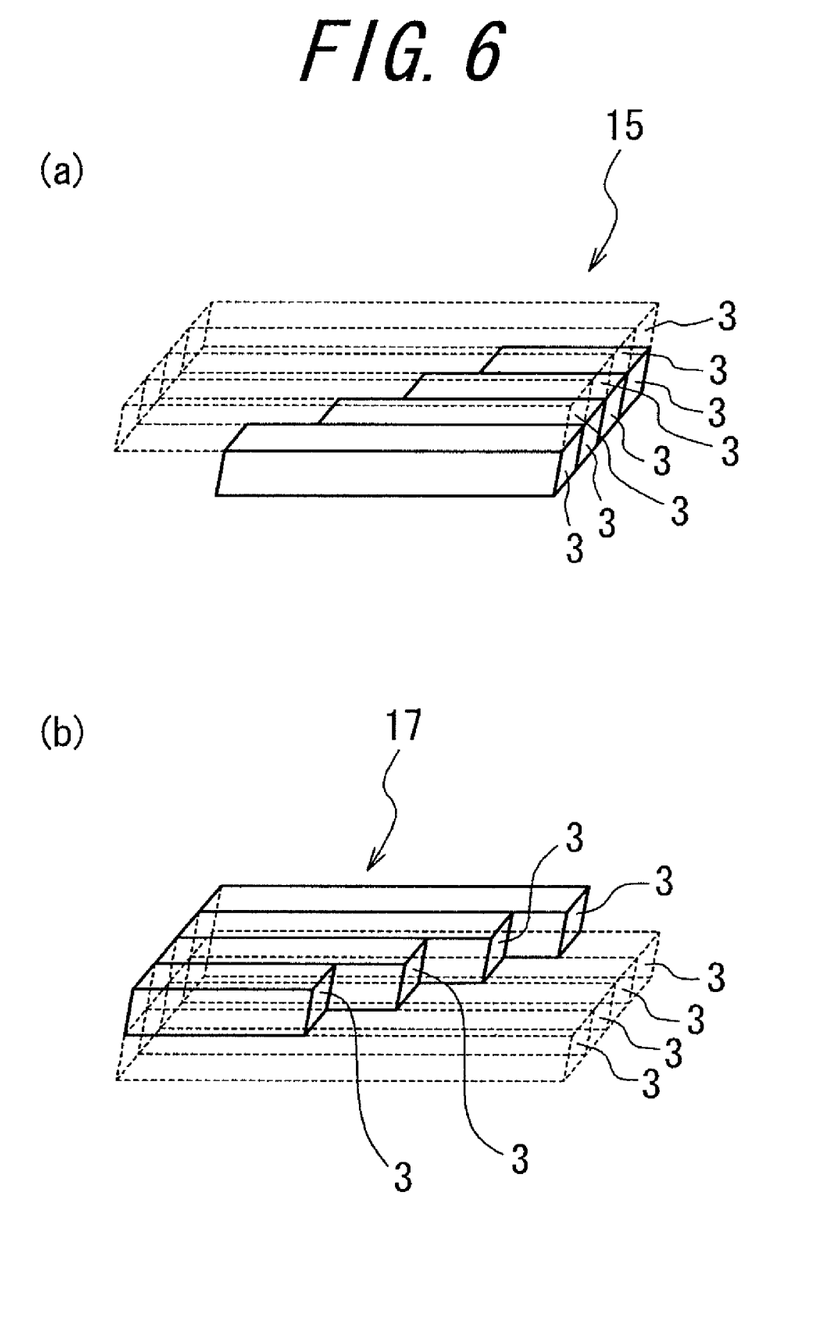
FIG. 6(a) is a perspective view schematically showing the winding starting end of the bead core.
FIG. 6(b) is a perspective view schematically showing the winding finishing end of the bead core.

In an embodiment as shown in FIGS. 6(*a*) and 6(*b*), the bead core 2 has a structure in which plural bead wires 3, wound around plural times to be stacked up in the tire radial direction as a laminated unit, are juxtaposed as units in plural rows in the tire widthwise direction and the winding starting end 15 and the winding finishing end 17 of each bead wire 3 are offset from each other in the tire circumferential direction. As described above, forming the bead core 2 by plural bead wires 3 is advantageous in terms of production efficiency. However, if the positions in the tire circumferential direction of the winding starting end 15 and the winding finishing end 17 of each bead wire 3 coincide with each other, i.e. if the winding starting end 15 and the winding finishing end 17 of each bead wires 3 were to be aligned with each other in the tire widthwise direction, there arises stepwise difference in rigidity between the winding starting end 15 and the winding finishing end 17, in other words, stress tends to concentrate on the site, and therefore fracture strength may deteriorate. Further, the winding starting end 15 and the winding finishing end 17 may each function as a fulcrum of the bending stress. In view of this, by offsetting the positions in the circumferential direction of the winding starting end 15 and the winding finishing end 17 of each bead wire 3 from each other, as shown in the present embodiment, the problem of stress concentration can be eluded, while the production efficiency of the bead core 2 is improved.

Figure 2:
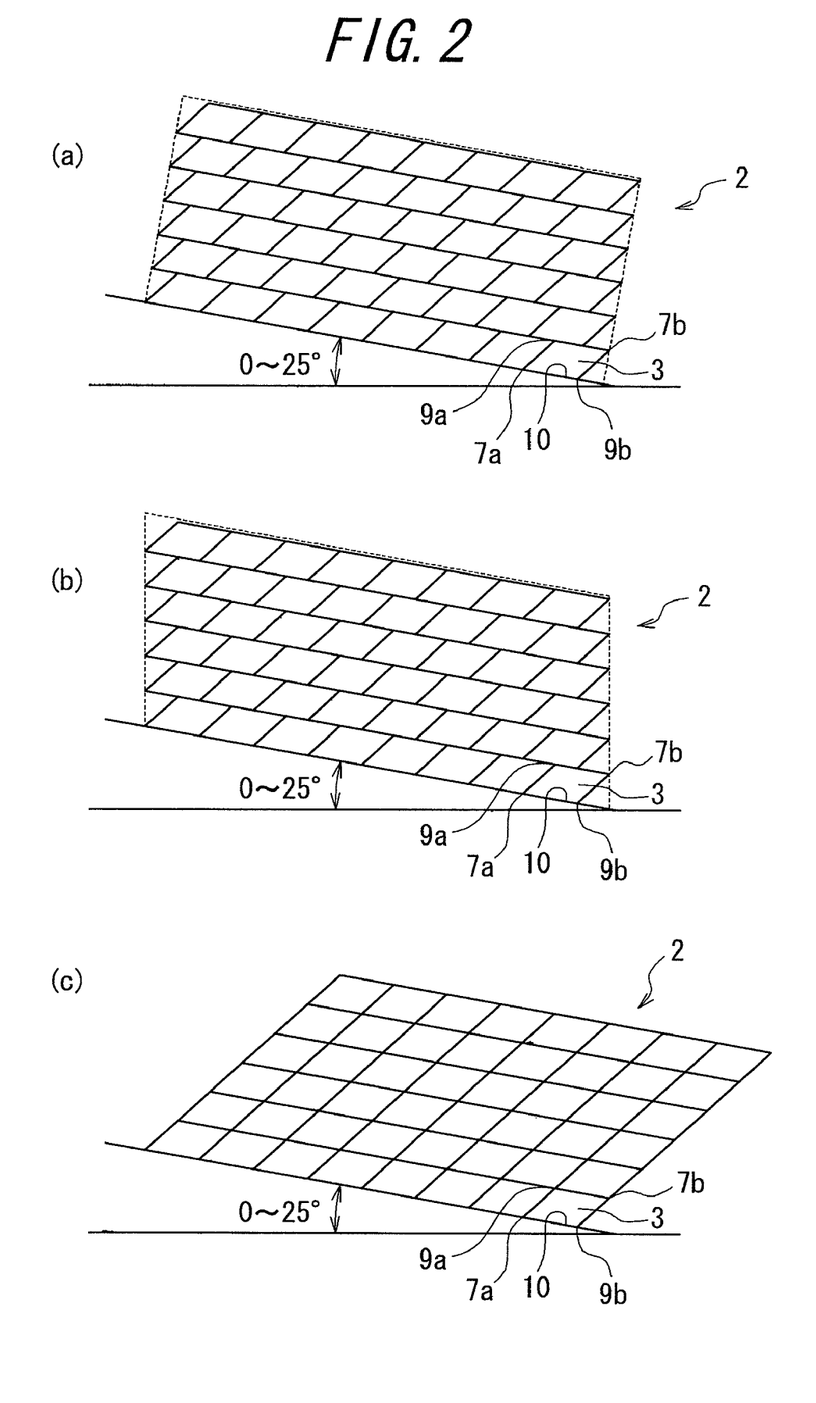
FIGS. 2(a) to 2(c) are sectional views in the tire widthwise direction, respectively showing various types of bead cores applicable to the present invention.
Figure 7:
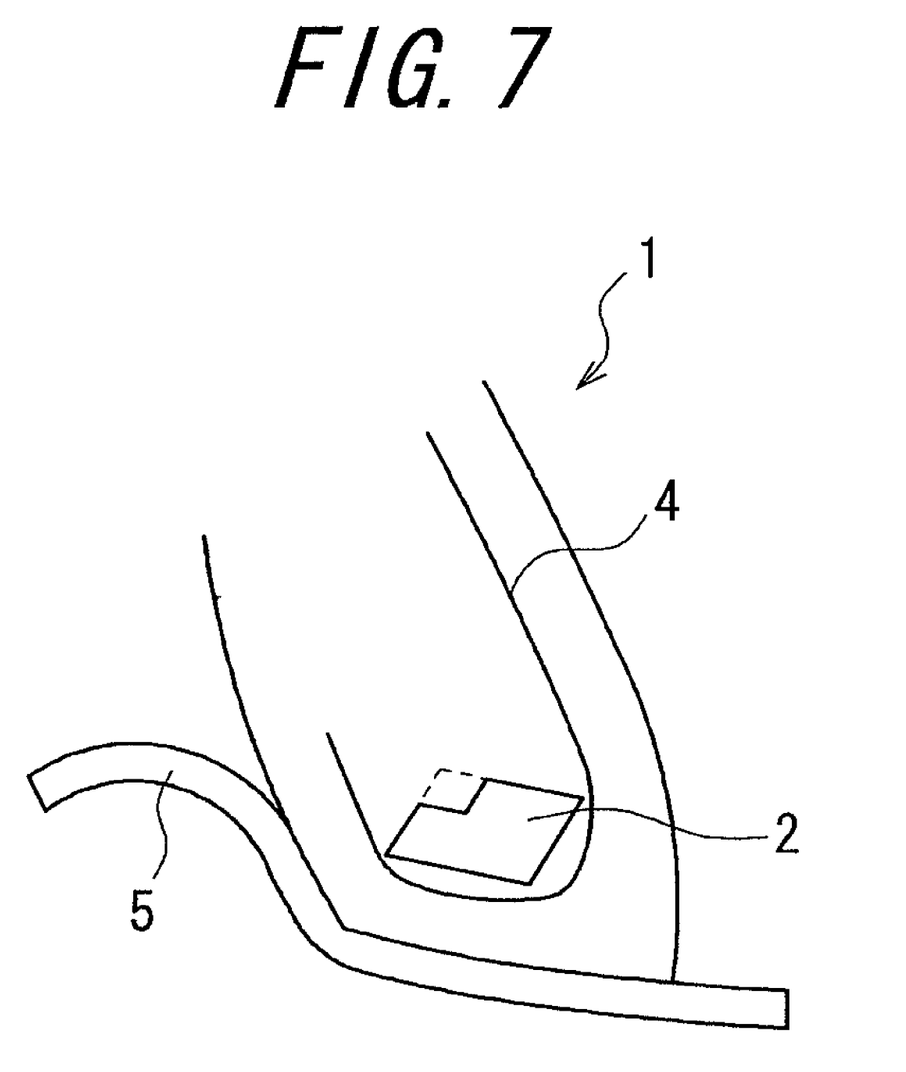
FIG. 7 is a sectional view in the tire widthwise direction of the bead portion in the pneumatic tire of yet another embodiment according to the present invention.

The sectional shape in the tire widthwise direction of the bead core 2 is preferably a parallelogram as shown in FIGS. 2(*b*) and 2(*c*) or a rectangle as shown in FIG. 2(*a*). Due to this feature, the bead core 2 as a whole has a sectional shape which can be easily obtained by forming. The sectional shape in the tire widthwise direction of the bead core 2 is not restricted to a parallelogram or a rectangle and may have, for example, an irregular shape such as a shape obtained by chipping a portion of a parallelogram, as shown in FIG. 7.

Figure 8:
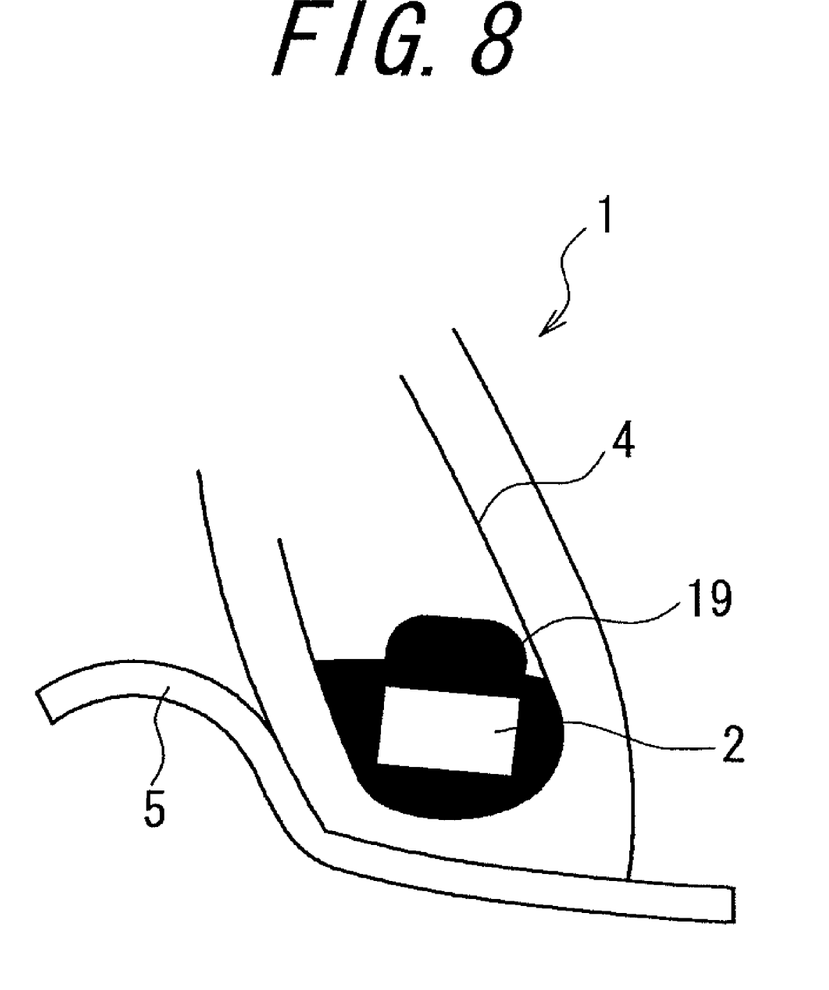
FIG. 8 is a sectional view in the tire widthwise direction of the bead portion in the pneumatic tire of yet another embodiment according to the present invention.

In an embodiment as shown in FIG. 8, a high hardness rubber 19 having rubber hardness of 85 Hs or larger is provided at least one of between the bead core 2 and the carcass 4 and on the upper side in the tire radial direction of the bead core 2. Rubber having relatively high rubber hardness exhibits its relatively small degree of flow during vulcanization, as compared with rubber having relatively low rubber hardness. Therefore, provision of the high hardness rubber 19 between the bead core 2 and the carcass 4 results in relatively small degree of rubber flow around the bead core 2 during vulcanization, whereby distortion of shape of the bead core 2 in vulcanization can be suppressed. Further, provision of the high hardness rubber 19 on the upper side in the tire radial direction of the bead core 2 can suppress collapse of the bead portion 1 when a load is exerted thereon, whereby shear strain generated in the bead portion 1 is decreased and durability of the bead portion 1 is improved.

Figure 9:
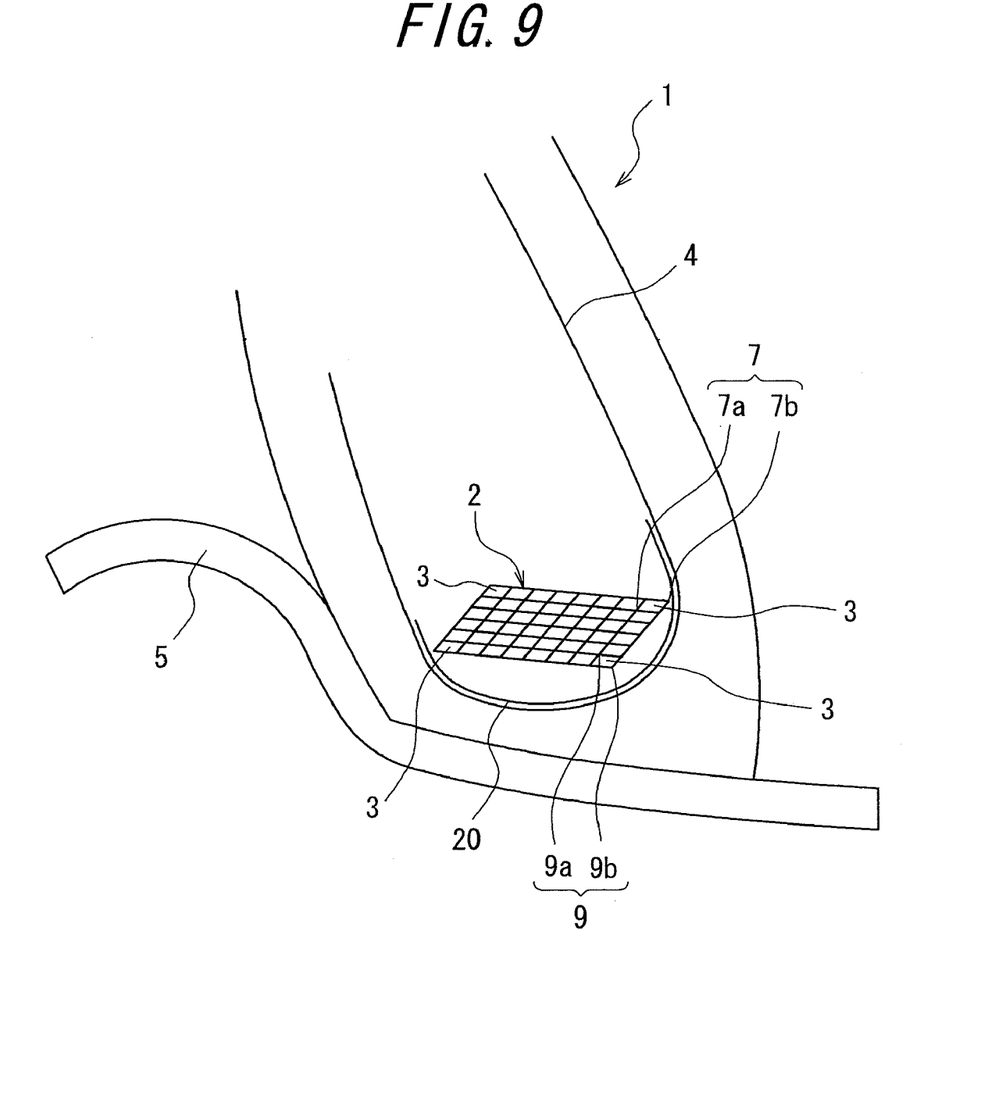
FIG. 9 is a sectional view in the tire widthwise direction of the bead portion in the pneumatic tire of yet another embodiment according to the present invention.

In an embodiment as shown in FIG. 9, a reinforcing layer 20 is provided between the carcass 4 and the bead core 2, along the curved surface of the carcass 4, in the bead portion 1 such that the reinforcing layer 20 wraps the bead core 2. The reinforcing layer 20 may be constituted of, for example, steel cord or organic fiber cord such as nylon. According to such structural features as described above, the reinforcing layer 20 functions to prevent the bead core from rotating and protect the carcass, whereby pulling-off of the carcass can be further suppressed and durability of the carcass and thus durability of the bead portion can be improved.

Figure 10:
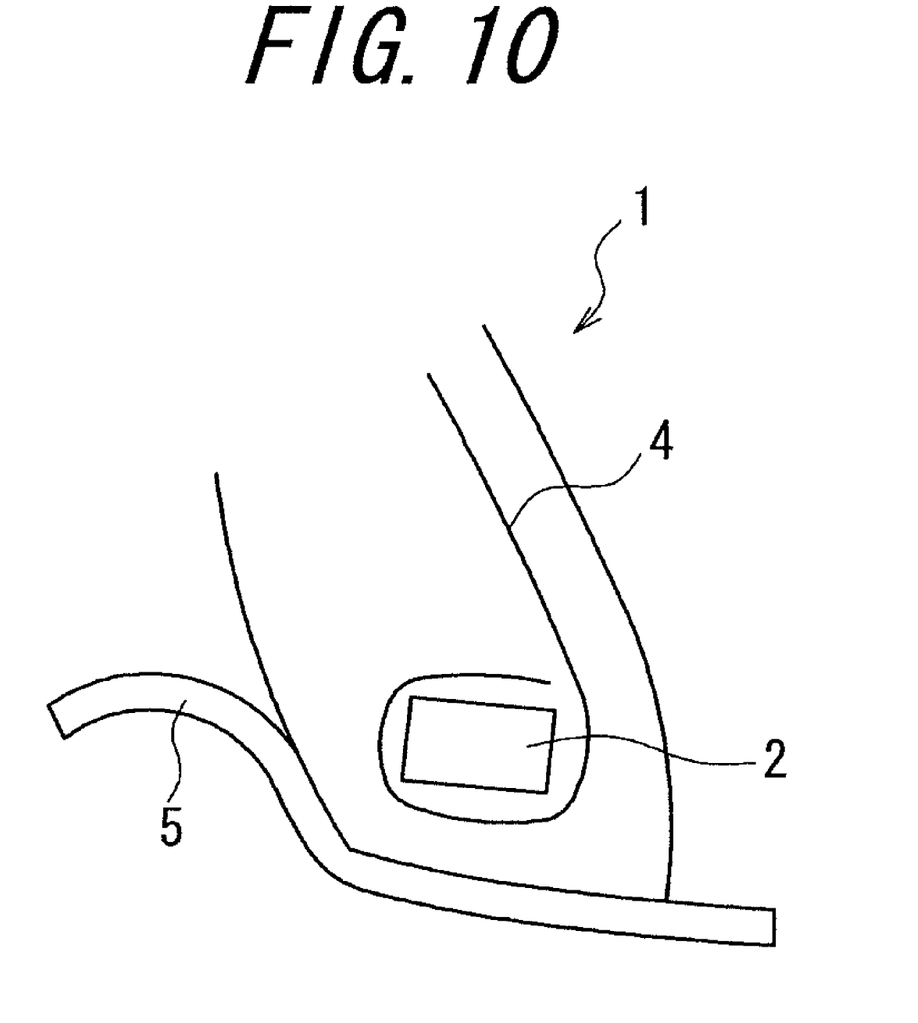
FIG. 10 is a sectional view in the tire widthwise direction of the bead portion in the pneumatic tire of yet another embodiment according to the present invention.

The foregoing descriptions only show a part of embodiments of the present invention, and the structures described above may be combined with each other and/or various modifications may be added thereto, unless such changes digress from the spirit of the present invention. For example, the carcass 4, which is provided to be turned up around the bead core 2 from the inner side toward the outer side thereof, may be disposed to surround the circumference of the bead core 2, as shown in FIG. 10. According to this structure, the carcass 4 is further prevented from being pulled out and thus durability of the bead portion 1 is further enhanced.

EXAMPLES

Next, in order to confirm an effect of the present invention, there were prepared test tires according to the present invention (Examples), a test tire for comparison (Comparative Example) and a test tire according to the conventional technique (Conventional Example). These tires were analyzed for comparison by following tests.

The tires used for the tests are radial tires for track/bus each having tire size of 11R22.5 and have following characteristics, respectively.

The tire of Example 1 is a tire provided with a bead portion having the structure as shown in FIG. 1. The bead core of the tire of Example 1 is formed by winding eight metal bead wires each having a parallelogram section (width: 2 mm, height: 1.3 mm, acute angle: 70 degrees, obtuse angle: 110 degrees) in the direction as shown in FIG. 1 in eight-row-juxtaposed manner in the tire widthwise direction and then further winding other sets of eight-row-juxtaposed bead wires in the tire radial direction to six layers, and fixedly binding these bead wires by a metal band. Further, the tire of Example 1 is structured such that respective end portions of the one-layer carcass are turned up around the bead core from the inner side toward the outer side thereof and four-layered belt is provided on the outer peripheral side of the carcass in a tread portion. The structures other than the bead portion are designed according to the conventional pneumatic tire and explanations thereof will be omitted.

The tire of Example 2 is a tire provided with a bead portion having the structure as shown in FIG. 1. The structure of the tire of Example 2 is substantially the same as that of the tire of Example 1, except that the acute angle and the obtuse angle in the parallelogram section of each bead wire of the former are 45 degrees and 135 degrees, respectively.

The tire of Comparative Example 1 is substantially the same as that of the tire of Example 1, except that the bead wires constituting the bead core of the former are disposed in the direction opposite to that of Example 1, i.e. the direction as shown in FIG. 3(b).

The tire of Conventional Example is structured such that a bead core is formed by using a round filament bead wire, instead of the aforementioned bead wire (not shown). Specifically, the bead core is formed by winding a single bead wire of 1.8 mm diameter, made of the same metal as the bead wires of Example 1 and Example 2, from the inner side to the outer side in the tire radial direction sequentially to be stacked up to six layers in a coil-like shape such that the bead wire is juxtaposed in seven-row, eight-row, nine-row, eight-row, seven-row and six-row in the tire widthwise direction in the respective layers. The sectional shape of the bead core is substantially hexagonal. The number of windings of the bead wire of Conventional Example is determined such that the resulting total sectional area in the tire widthwise direction of the bead wires is the same as the total sectional areas in the tire widthwise direction of the bead wires of Examples 1 and 2. Other structures of the tire of Conventional Example are substantially the same as those of the tires of Examples 1 and 2.

Tests for analyzing rotational change of the bead core and durability of the bead portion 1 were conducted by the method described below using each of the test tires described above.

(Test for Analyzing Rotational Change of the Bead Core)

Rotational change of the bead core was analyzed by: assembling each of the test tires with a rim having 8.25 size; taking a photograph of a sectional shape in the tire widthwise direction of the bead core by a CT scan device in a state where the tire had not been inflated and a state where the tire had been inflated at an internal air pressure of 700 kPa (relative pressure), respectively; and comparing the photograph of the bead core in the state prior to inflation with that in the state after inflation. The results are shown in Table 1.

(Test for Analyzing Durability)

The durability of the bead portion 1 was assessed by assembling each of the test tires with a rim of size 8.25, inflating the tire at an internal air pressure of 700 kPa (relative pressure), and making the tire run on an indoor tire tester until a trouble occurred in the bead portion. The conditions in the drum test were as follows. The room temperature: 45° C., the load applied on the tire: 57 kN (180% of the normal load), and the rotational speed of the tire: 60 km/h. The results are shown in Table 1.

TABLE 1

|  | Rotational angle of bead core (degree) | Running distance achieved prior to occurrence of trouble (km) |
|---|---|---|
| Example 1 | 1.0 | 49000 |
| Example 2 | 1.35 | 43000 |
| Comparative Example 1 | 2.4 | 30000 |
| Conventional Example | 2.5 | 28000 |

As a result of these tests, it has been proved that: the smaller change in rotational angle of the bead core between before and after the inflation of the tire results in the larger running distance prior to occurrence of a trouble; and thus durability of the bead portion can be enhanced by increasing rotational rigidity of the bead core.

Between Conventional Example 1 and Comparative Example 1, there is observed no significant improvement in either the change in rotational angle of the bead core between before and after inflation of the tire or the running distance achieved prior to occurrence of a trouble. Therefore, it is understood that simply modifying a sectional shape of each bead wire and a contact area of one bead wire with another bead wire cannot enhance durability of the bead portion.

In contrast, in the tires of Examples 1 and 2, where the bead wires having a parallelogram sectional shape are arranged such that the first acute corner portion is positioned on the inner side on the tire radial direction and on the outer side in the tire widthwise direction as shown in FIG. 1 according to the present invention, durability is significantly improved, as compared with the tires of Conventional Example and Comparative Example 1. Further, in a case where the angle at the acute corner portion and the angle at the obtuse corner portion are set at 70 degrees and 110 degrees, respectively, durability of the bead portion is further improved.

INDUSTRIAL APPLICABILITY

According to the pneumatic tire of the present invention, rotational rigidity of a bead core as a whole can be increased and pulling-off of a carcass can be suppressed by optimizing a sectional shape of each bead wire and arrangement of the bead wires. Further, the distribution of tension in the circumferential direction in a section in the tire widthwise direction, of the bead wires, can be made even by such optimization as described above, whereby durability of the bead wire is improved and thus durability of the bead portion can also be significantly improved.

The invention claimed is:

1. A pneumatic tire comprising:
a pair of bead portions having bead cores embedded therein, each bead core being constituted of annular bead wires juxtaposed in the tire widthwise direction; a pair of side wall portions extending from the bead portions on the outer side in the tire radial direction; a tread portion extending over the respective sidewall portions; and a carcass extending in a toroidal shape across the aforementioned portions and having respective end portions being turned up around the bead cores,
wherein the bead wire has, in a section in the tire widthwise direction, a parallelogram section having a pair of acute corner portions including a first acute corner portion and a second acute corner portion and a pair of obtuse corner portions including a first obtuse corner portion and a second obtuse corner portion,
the first acute corner portion is positioned on the outer side in the tire widthwise direction and on the inner side in the tire radial direction of the second acute corner portion,
the first obtuse corner portion is positioned on the inner side in the tire widthwise direction and on the outer side in the tire radial direction of the first acute corner portion, and
the second obtuse corner portion is positioned on the inner side in the tire widthwise direction of the first acute corner portion and on the inner side or aligned, in the tire radial direction, of/with the first acute corner portion.

2. The pneumatic tire of claim 1, wherein the adjacent bead wires are in contact with each other.

3. The pneumatic tire of claim 1, wherein an angle formed by a side between the first acute corner portion and the second obtuse corner portion of a parallelogram section of each bead wire, with respect to the tire widthwise direction, is in the range of 0 to 25°.

4. The pneumatic tire of claim 1, wherein the acute corner portions of each bead wire are preferably chamfered.

5. The pneumatic tire of claim 1, wherein, in each bead core, the bead wires are fixed as a bundle by a metal band or a textile spirally wound thereon in the direction in which the bead core extends.

6. The pneumatic tire of claim 1, wherein, each bead core is formed by winding plural bead wires plural times to stack the bead wires up in the tire radial direction as a bead wire unit and juxtaposing plural bead wire units in the tire widthwise direction, and the winding starting end and the winding finishing end of the same one bead wire are positioned to be offset from each other in the tire circumferential direction of the bead core.

7. The pneumatic tire of claim 1, wherein, each bead core is formed by winding plural bead wires plural times to stack the bead wires up in the tire radial direction as a bead wire unit and juxtaposing plural bead wire units in the tire widthwise direction, and the winding starting ends of the respective bead wires are offset from each other in the tire circumferential direction and the winding finishing ends of the respective bead wires are offset from each other in the tire circumferential direction.

8. The pneumatic tire of claim 1, wherein an angle formed by a line linking the position in the tire circumferential direction of the winding starting end of each bead core and the center of the bead core, with respect to a line linking the position in the tire circumferential direction of the winding finishing end of the bead core and the center of the bead core, is in the range of 30 to 90°.

9. The pneumatic tire of claim 1, wherein a sectional shape in the tire widthwise direction of each bead core is a parallelogram or a rectangle.

10. The pneumatic tire of claim 1, wherein a rubber member having rubber hardness of 85 Hs or higher is provided at least one of between the bead core and the carcass and on the upper side in the tire radial direction of the bead core.

11. The pneumatic tire of claim 1, wherein a reinforcing layer is provided between the carcass and the bead core such that the reinforcing layer wraps the bead core.

12. The pneumatic tire of claim 1, where the bead wire is arranged such that the first acute corner portion and the first obtuse corner portion vertically next to each other in the tire radial direction are in direct contact with each other.

* * * * *